J. R. SNYDER.
ENGINEER'S BRAKE VALVE.
APPLICATION FILED SEPT. 21, 1912.

1,102,100.

Patented June 30, 1914.
2 SHEETS—SHEET 1.

WITNESSES
W. T. Holman
Wm. O. Larkin

INVENTOR
Jacob Rush Snyder
By Fredk H. Wheeler
Attorney

J. R. SNYDER.
ENGINEER'S BRAKE VALVE.
APPLICATION FILED SEPT. 21, 1912.

1,102,100.

Patented June 30, 1914.
2 SHEETS—SHEET 2.

WITNESSES
W. J. Holman
Wm. P. Larkin

INVENTOR
Jacob Rush Snyder,
By Fred'k W. Winter,
Attorney

UNITED STATES PATENT OFFICE.

JACOB RUSH SNYDER, OF PITTSBURGH, PENNSYLVANIA, ASSIGNOR TO PERCY E. DONNER, OF PITTSBURGH, PENNSYLVANIA.

ENGINEER'S BRAKE-VALVE.

1,102,100.  Specification of Letters Patent.  Patented June 30, 1914.

Application filed September 21, 1912. Serial No. 721,686.

*To all whom it may concern:*

Be it known that I, JACOB RUSH SNYDER, a resident of Pittsburgh, in the county of Allegheny and State of Pennsylvania, have invented a new and useful Improvement in Engineers' Brake-Valves, of which the following is a specification.

The invention relates to engineers' valves for air brake systems.

The object of the invention is to provide an engineer's valve of the standard Westinghouse type capable of being used in a standard air brake system and which gives a better control over the engine and train brakes, both jointly and separately, than engineers' valves as heretofore constructed.

The invention comprises a valve having ports, cavities and passages arranged and controlled as hereinafter described and claimed.

Figure 2:
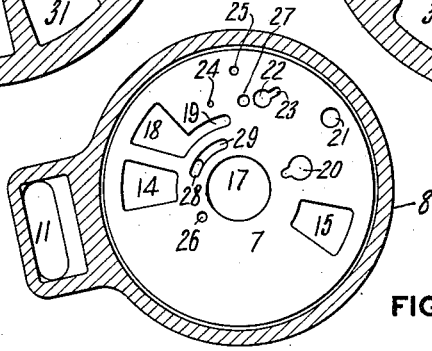
Figure 1:
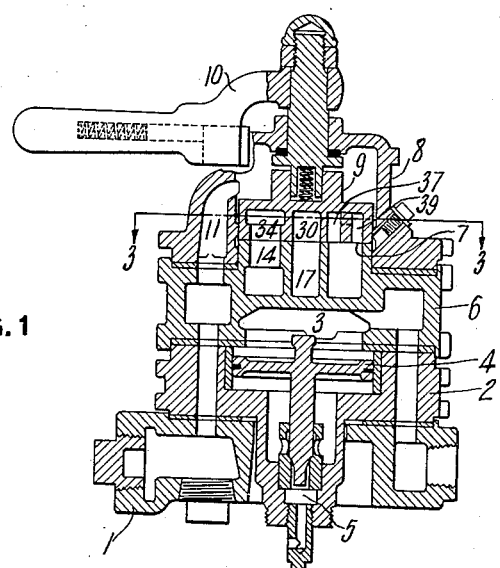
Figure 3:
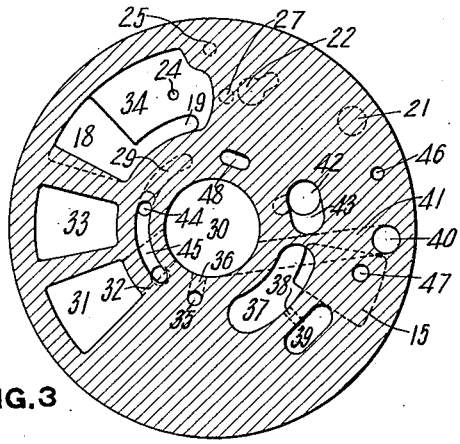
Figure 4:
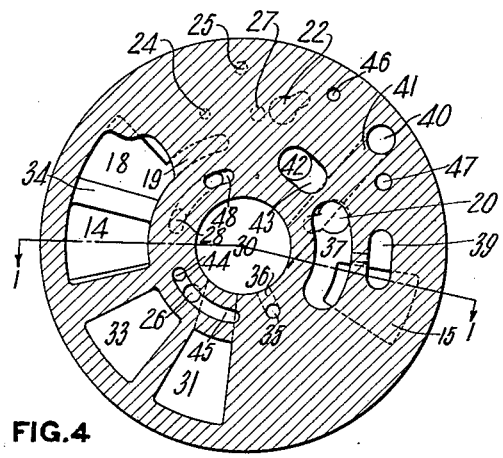

In the accompanying drawings Figure 1 is a vertical section through the valve in engine release and running position, Fig. 4; Fig. 2 is a horizontal section through the valve showing the valve seat in plan; and Figs. 3, 4, 5, 6, 7, 8, 9 and 10 are diagrammatic views indicating the valve seat in plan and showing the rotary disk in horizontal section on the line 3—3, Fig. 1, and illustrating the different positions of the valve.

The valve as to general type and construction is shown identical with existing forms of Westinghouse brake valves, and it is adapted for use with the standard Westinghouse E. T. equipment system or with a system such as described and illustrated in my application filed July 23, 1911, Serial No. 711,433. This valve comprises the base member 1, to which the several pipes are connected, an intermediate member 2 resting on the base member and containing a chamber 3 for the equalizing piston 4 controlling an exhaust 5 from the train pipe chamber below said piston, a seat member 6 resting on the intermediate member 2 and provided on its upper face with the valve seat 7, the top inclosing member 8, the rotary disk valve 9 in said top member 8 and coöperating with the seat 7, the usual operating handle 10, and suitable means for securing these several parts together. The valve casing is provided as usual with a passage 11 for introducing main reservoir pressure on top of the rotary disk 9, as is usual with Westinghouse engineers' brake valves, and the valve has all of the usual pipe connections of the present standard Westinghouse H-6 automatic brake valve as designed for use with Westinghouse No. 6 E. T. locomotive equipment.

The valve seat is provided with the several ports shown in Fig. 2, as follows: Ports 14 and 15, both connected to the train pipe and located approximately 150 degrees one from the other; a central exhaust port 17 leading to the atmosphere; a large port 18 located in proximity to train pipe 14 and provided at one side with an arc-shaped extension 19 and connected to the main reservoir by way of the feed valve; a port 20 having communication with the equalizing reservoir and with the chamber 3 on top of the equalizing piston 4; a port 21 near the periphery of the seat and connected to the application chamber of the usual Westinghouse distributing valve, for the purpose of exhausting said application chamber; a port 22 provided with an extension 23 and constituting a straight air application port, that is, for the direct application of the engine brakes, and which in the Westinghouse system communicates with the application chamber of the distributing valve, but which in the system of my application Serial No. 711,433, filed July 25, 1912, communicates with an application valve for applying the engine brakes, and which may be connected directly to the engine brake cylinders; a small warning port 24 leading to the atmosphere; a port 25 in the position of the usual preliminary exhaust port of the Westinghouse brake valve and which communicates with the equalizing reservoir; a port 26 communicating with the pump governor; a port 27 in proximity to port 22 and connected with a steam cut-off valve, that is, a valve arranged to cut off the supply of steam from the engine cylinders; and a port 28 provided with an extension 29 which leads to a valve which serves to maintain the train pipe pressure against leakage and to apply the engine brakes and cut off the steam supply when the train line bursts, such as illustrated and described in my application Serial No. 711,433.

All of the ports above described, with the exception of the ports 27 and 28 and the extension 23 on port 22, are present in the standard Westinghouse H-6 automatic brake valve and located as shown in the drawings. In my improved valve I have retained all of the Westinghouse ports in the valve seat, and have connected the same substantially as in the Westinghouse system, and have added the two additional ports 27 and 28 and the extension 23 to port 22.

The rotary disk 9 is provided with ports. cavities and passages as follows: A central exhaust cavity 30 directly over and communicating with the exhaust port 17 in the seat; a large cavity 31 communicating by passage 32 with the central cavity 30; a large hole 33 extending entirely through the disk and located in proximity to cavity 31; a large arc-shaped cavity 34 located in proximity to cavity 33; a small cavity 35 connected by passage 36 with the central cavity 30; an arc-shaped cavity 37 located relatively near the center of the disk and communicating by passage 38 with a smaller cavity 39 located nearer the periphery of the disk; a small cavity 40 located near the periphery of the disk and connected by passage 41 with the central cavity 30; a hole 42 provided on the face of the disk with a lateral extension 43, and a hole 44 provided with an arc-shaped extension 45. All of the parts so far described are exactly the same as in the standard Westinghouse H-6 brake valve. In addition to these, the rotary disk is provided with a hole 46 located near the periphery of the disk; a hole 47 located substantially in line between the cavities 39 and 40; and a hole 48 located adjacent the central cavity 30. The term "hole" has been used above to designate an opening extending entirely through the rotary disk, the term "cavity" to designate a recess in the under face of the disk but not extending entirely through the disk, and the term "passage" to designate an opening in the body of the disk between its upper and lower faces.

The valve described has eight positions as follows:

1. *Release position, shown in Fig. 3.*—In this position the large hole 33 registers with train pipe 14, so that the main reservoir pressure on top of the rotary disk passes directly to the train pipe; cavity 34 connects main reservoir port 18 with warning port 24, in order to advise the engineer that the valve is in release position, so that he will move it back to lap or running position before the brake pipe is overcharged; hole 42 registers with port 20 so that the equalizing reservoir and the chamber 3 above equalizing piston 4 are charged to the same pressure as the train pipe; hole 44 registers with port 26 and its extension 45 overlaps port 26 so that air is supplied to both the pump governor and to the train pipe leakage maintenance valve. All other ports are blanked.

The valve will be left in this position only long enough to release the brakes, and will then be moved to the next position now to be described.

2. *Running and engine release position, shown in Fig. 4.*—This position is assumed either after full release as above described and during normal running, and also after an application of the engine brakes in order to release the latter. In this position the disk has been rotated contra-clockwise from release position. The direct connection between the main reservoir and train pipe is now broken, but cavity 34 connects main reservoir port 18 with train pipe port 14 so that the train pipe is now supplied with main reservoir pressure as reduced by the feed valve; extension 45 of hole 44 still covers pump governor port 26 so that the latter is still supplied with air; hole 48 overlaps extension 29 of port 28 so that air is still supplied to the train pipe leakage maintenance valve; cavity 37 connects train pipe port 15 with the equalizing reservoir port 20 so that the pressures in the train pipe and equalizing reservoir equalize; and cavity 40 covers port 21 to release pressure from the engine brake cylinders or the special application valve therefor. All other ports are blanked.

Figure 5:
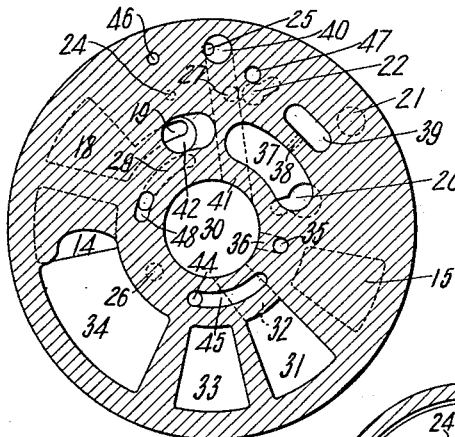

3. *Service position, shown in Fig. 5.*—This position is assumed by rotating the valve contra-clockwise from running position through an angle of approximately fifty degrees. In this position cavity 40 overlaps equalizing reservoir port 25 so that pressure is released therefrom through passage 41 to the central exhaust cavity 30. The train pipe connection with the main reservoir is of course broken and reservoir pressure above the equalizing piston 4 is reduced, permitting the equalizing valve to open to vent the train pipe to the atmosphere. This sets the brakes with the desired service application, depending upon the amount of pressure vented from the equalizing reservoir. Hole 48 also registers with port 28 so that main reservoir pressure can flow to the train pipe pressure maintenance valve so that should the pressure in the train pipe be reduced below that retained in the equalizing reservoir it will be restored automatically by said valve, or in case a hose bursts the steam supply to the engine cylinders is cut off and the engine brakes applied, as fully described in my application Serial No. 711,433, above identified. All other ports are blanked as far as any functional effect is concerned.

Figure 6:
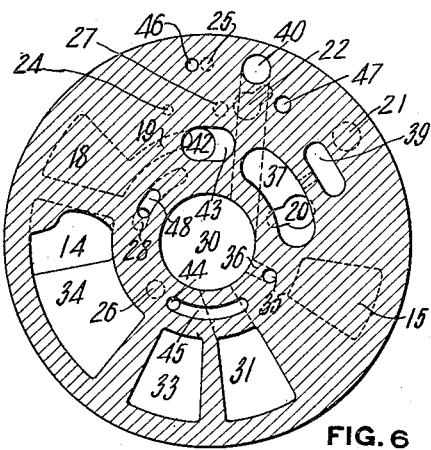

4. *Lap position, shown in Fig. 6.*—This position is secured by moving the valve slightly clockwise from service position. In this position the connection between equalizing reservoir port 25 and exhaust port 17 is broken. Hole 48 still overlaps the extension 29 of port 28 thereby maintaining the train pipe pressure maintenance valve in the condition last described. All other ports still remain blanked.

Figure 7:
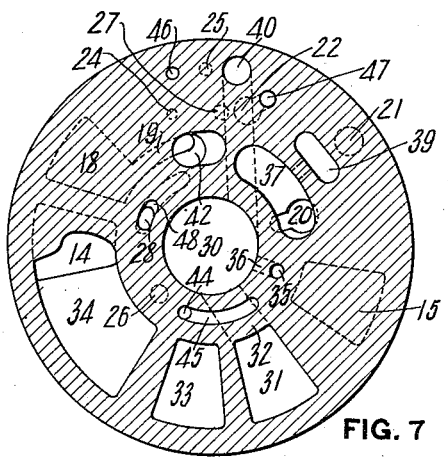

5. *Engine application position, shown in Fig. 7.*—This position is secured either from running or lap positions by moving the valve contra-clockwise or from service position by moving the valve slightly contra-clockwise. In this position the hole 48 still overlaps the extension 29 of port 28, thereby maintaining the train pipe leakage maintenance valve in the condition last described. The important functional feature, however, is that hole 47 laps over the extension 23 of port 22, thereby permitting main reservoir air to flow either to the distributing valve, as in the Westinghouse system, or to the application valve as in my system, and in either event applies the engine brakes without applying the train brakes. All other ports are blanked as far as any functional effect is concerned. To release the engine brakes after an application in the manner just described, the valve is moved to position No. 2, running position, in which position the cavity 40 overlaps port 21 so that fluid pressure is exhausted either from the application chamber of the Westinghouse distributing valve or from my brake application valve through passage 41 to the central exhaust cavity 30.

Figure 8:
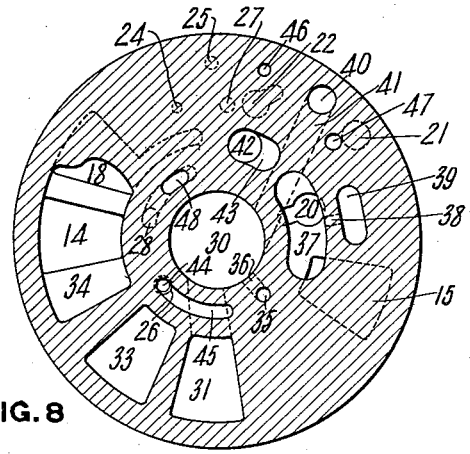

6. *Engine holding and train release position, shown in Fig. 8.*—This position is assumed by rotating the valve clockwise from either lap, service, or engine application positions. In this position cavity 34 connects main reservoir port 18 with train pipe port 14 to increase the train pipe pressure and release the brakes. At the same time cavity 37 connects train pipe port 15 with equalizing reservoir port 20 to increase the pressure in the equalizing reservoir and in chamber 3 until it equalizes with train pipe pressure. By this means the train brakes are released, but the ports 21 and 22 are both blanked so that the engine brakes are held. Hole 48 still supplies pressure through port 28 and extension 29 to the train pipe pressure maintenance valve, while hole 44 communicates with the pump governor port 26.

Figure 9:
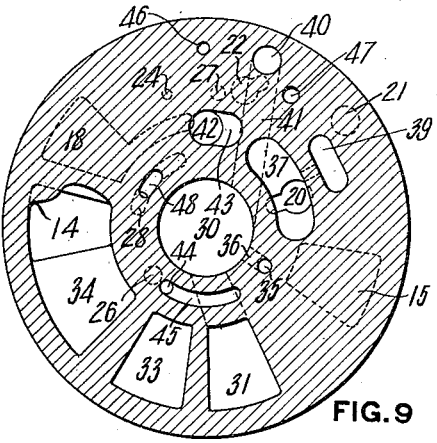

7. *Graduated release position, shown in Fig. 9.*—This position is assumed by moving the valve slightly clockwise from either service or lap positions. In this position the hole 46 registers with equalizing reservoir port 25, thereby supplying main reservoir pressure to the equalizing reservoir and through the train pipe leakage maintenance valve of my application Serial No. 711,433 builds up the pressure in the train until it equals the auxiliary reservoir pressure, thereby correspondingly decreasing the brake pressure. By moving the valve back and forth to this position the brakes can be graduated off to any desired extent. The hole 48 still registers with the extension 29 of port 28 so as to supply the train pipe pressure maintenance valve with main reservoir pressure to be admitted to the train pipe by increase of equalizing reservoir pressure as just described.

Figure 10:
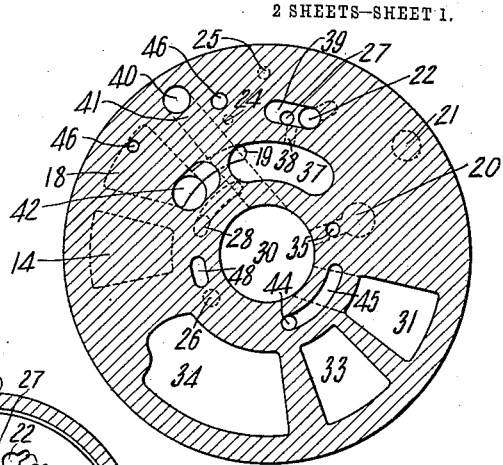

8. *Emergency position, shown in Fig. 10.*—This position is assumed by moving the valve to its extreme position contra-clockwise. In this position cavity 31 in the rotary disk communicates with train pipe port 15, thereby venting the train pipe through passage 32 to the central exhaust cavity 30 and securing an emergency application of the train brakes. In addition, the small port 35 overlaps the extension on equalizing reservoir port 20 thereby also venting the equalizing reservoir to the atmosphere. Cavity 37 also overlaps the extension 19 of main reservoir port 18, while cavity 39 overlaps the steam cut-off valve port 27 and the straight air application port 22 so that air can flow from the main reservoir through the port 18, extension 19, cavity 37, passage 38 and cavity 39 to both the steam cut-off valve and straight air application port, thereby cutting off the supply of steam to the locomotive and also applying the engine brakes simultaneously with the application of the train brakes. Hole 42 overlaps the main reservoir port 18, so that the pressure flowing to the steam cut-off valve and to the straight air application port is not reduced by the feed valve.

The valve described is normally set in running position after having been in full release position. Service and emergency applications are made in the usual way by moving the valve contra-clockwise to the desired degree. After an emergency application the valve is invariably brought back to full reelase position to quickly charge the train pipe and equalizing reservoirs and release the brakes throughout. After service application the valve can be brought back either to full release position to release the brakes, after which the valve is again set in running position, or it may be set in various other positions, such as lap position, Fig. 6, engine holding and train release position, Fig. 8, or graduated release position, Fig. 9.

The warning port 24 is open in full release position, which is the only position in which the main reservoir is connected directly to the train pipe and in which there is danger of overcharging the train pipe if the valve is allowed to remain too long in this position. The escape of air through the warning port advises the engineer that the valve is in such position that overcharging of the train line is likely to occur if the valve is allowed to remain too long in that position.

The port 28 leading to the train pipe maintenance valve is connected to the main reservoir in all positions except in emergency application position so that in all other positions of the valve, in case of leakage of the train line, it is automatically replenished, and in case of a break in the train line fluid pressure will be supplied to both the steam cut-off valve and to apply the engine brakes.

The valve described has all of the positions and performs all the functions of the Westinghouse H–6 automatic valve, to-wit, release, running, holding, lap, service, and emergency positions, and in addition provides for the graduated release of the brakes, and the independent application and release of the engine brakes. The valve in its structural features is the same as and interchangeable with the standard Westinghouse H–6 valve, but provides for the additional functions described.

What I claim is:—

1. A Westinghouse standard engineer's valve having a seat provided with ports communicating with the atmosphere, the train pipe, the main reservoir and the equalizing reservoir, and a movable member provided with ports and cavities coöperating with said seat ports and arranged in different positions to apply the brakes in service or emergency, to lap the brakes, and to release the brakes, said valve seat being provided with an additional port communicating with a steam cut-off valve, and said movable member being provided with a cavity arranged in emergency position to connect the main reservoir with said steam cut-off valve port.

2. A Westinghouse standard engineer's valve having a seat provided with ports communicating with the atmosphere, the train pipe, the main reservoir and the equalizing reservoir, and a movable member provided with ports and cavities coöperating with said seat ports and arranged in different positions to apply the brakes in service or emergency, to lap the brakes, and to release the brakes, said valve seat being provided with an additional port communicating with a train pipe pressure maintenance valve, and said movable member being provided with an additional cavity arranged in running, holding, and lap positions to connect the main reservoir to said train pipe pressure maintenance valve port.

3. A Westinghouse standard engineer's valve having a seat provided with ports communicating with the atmosphere, the train pipe, the main reservoir and the equalizing reservoir, and a movable member provided with ports and cavities coöperating with said seat ports and arranged in different positions to apply the brakes in service or emergency, to lap the brakes, and to release the brakes, said valve seat being provided with an additional port communicating with a train pipe pressure supply valve, and said movable member being provided with an opening arranged in an additional position of the movable member to connect the main reservoir with said train pipe pressure supply valve to graduate off the brakes.

4. A Westinghouse standard engineer's valve having a seat provided with ports communicating with the atmosphere, the train pipe, the main reservoir and the equalizing reservoir, and a movable member provided with ports and cavities coöperating with said seat ports and arranged in different positions to apply the brakes in service or emergency, to lap the brakes, and to release the brakes, said valve seat being provided with an additional port communicating with a train pipe pressure supply valve, and said movable member being provided with an opening arranged in running, holding, and lap positions to connect the main reservoir to said train pipe pressure supply valve port and with another opening arranged in an additional position of the valve to also connect the main reservoir with said train pipe pressure supply valve port to graduate off the brakes.

5. A Westinghouse standard engineer's valve having a seat provided with ports communicating with the atmosphere, the train pipe, the main reservoir and the equalizing reservoir, and a movable member provided with ports and cavities coöperating with said seat ports and arranged in different positions to apply the brakes in service or emergency, to lap the brakes, and to release the brakes, said valve seat being provided with another port communicating with a brake application valve, and said movable member being provided with one opening arranged in emergency position to connect the main reservoir to said brake application valve port and with an additional opening arranged in another position of the valve to also connect the main reservoir to said brake application valve port.

6. A Westinghouse standard engineer's valve having a seat provided with ports communicating with the atmosphere, the train pipe, the main reservoir and the equalizing reservoir, and a movable member provided with ports and cavities coöperating with said seat ports and arranged in different positions to apply the brakes in service or emergency, to lap the brakes, and to release the brakes, said valve seat being provided with two additional ports, one communicating with a brake application valve and another communicating with a train pipe pressure supply valve, and said movable member being provided with one opening arranged in one position of the movable member to connect the main reservoir with said brake application valve and with another opening arranged in the same position and also in lap and running positions to connect the main reservoir to the train pipe pressure supply valve.

7. A Westinghouse standard engineer's valve having a seat provided with ports communicating with the atmosphere, the train pipe, a main reservoir and an equalizing reservoir, and a movable member provided with ports and cavities coöperating with said seat ports and arranged in different positions to apply the brakes in service or emergency, to lap the brakes, and to release the brakes, said movable member being provided with a cavity arranged in service position to connect the equalizing reservoir port to the atmosphere and with an opening arranged in another position of the valve to connect the main reservoir to the equalizing reservoir port to graduate off the brakes.

8. A Westinghouse standard engineer's valve having a seat provided with ports communicating with the atmosphere, the train pipe, a main reservoir, an equalizing reservoir, and a brake application valve, and a movable member provided with ports and cavities coöperating with said seat ports and arranged in different positions to apply the brakes in service or emergency, to lap the brakes, to release the brakes, and to release the train brakes and hold the engine brakes, said rotary valve being provided with a cavity arranged in emergency application position to connect the main reservoir to said brake application valve port, and with an additional opening arranged in another position of said movable member to also connect the main reservoir to said brake application port.

9. A Westinghouse standard engineer's valve having a seat provided with ports communicating with the atmosphere, the train pipe, a main reservoir, an equalizing reservoir, and a brake application valve, and a movable member provided with ports and cavities coöperating with said seat ports and arranged in different positions to apply the brakes in service or emergency, to lap the brakes, to release the brakes, and to release the train brakes and to hold the engine brakes, said valve seat being provided with an additional port communicating with a steam cut-off valve, and said movable member being provided with a cavity arranged in emergency position to connect the main reservoir to said steam cut-off valve port and to said brake application valve port.

10. A Westinghouse standard engineer's valve having a seat provided with ports communicating with the atmosphere, the train pipe, a main reservoir, an equalizing reservoir, and a brake application valve, and a movable member provided with ports and cavities coöperating with said seat ports and arranged in different positions to apply the brakes in service or emergency, to lap the brakes, to release the brakes, and to release the train brakes and hold the engine brakes, said valve seat being provided with an additional port communicating with a steam cut-off valve, and said movable member being provided with a cavity arranged in emergency position to connect the main reservoir with said steam cut-off valve port.

11. A Westinghouse standard engineer's valve having a seat provided with ports communicating with the atmosphere, the train pipe, a main reservoir, an equalizing reservoir, and a brake application valve, and a movable member provided with ports and cavities coöperating with said seat ports and arranged in different positions to apply the brakes in service or emergency, to lap the brakes, to release the brakes, and to release the train brakes and hold the engine brakes, said valve seat being provided with an additional port communicating with a train pipe pressure maintenance valve, and said movable member being provided with an additional cavity arranged in running, holding, and lap positions to connect the main reservoir to said train pipe pressure maintenance valve.

12. A Westinghouse standard engineer's valve having a seat provided with ports communicating with the atmosphere, the train pipe, a main reservoir, an equalizing reservoir, and a brake application valve, and a movable member provided with ports and cavities coöperating with said seat ports and arranged in different positions to apply the brakes in service or emergency, to lap the brakes, to release the brakes, and to release the train brakes and hold the engine brakes, said valve seat being provided with an additional port communicating with a train pipe pressure supply valve, and said movable member being provided with an opening arranged in an additional position of the movable member to connect the main reservoir with said train pipe pressure supply valve to graduate off the brakes.

13. A Westinghouse standard engineer's valve having a seat provided with ports communicating with the atmosphere, the train pipe, a main reservoir, an equalizing reservoir, and a brake application valve, and a movable member provided with ports and cavities coöperating with said seat ports and arranged in different positions to apply the brakes in service or emergency, to lap the brakes, to release the brakes, and to release the train brakes and hold the engine brakes, said valve seat being provided with an additional port communicating with a train pipe pressure supply valve, and said movable member being provided with an opening arranged in running, holding, and lap positions to connect the main reservoir to said train pipe pressure supply valve port and with another opening arranged in an additional position of the valve to also connect the main reservoir with said train pipe pressure supply valve port to graduate off the brakes.

14. A Westinghouse standard engineer's valve having a seat provided with ports communicating with the atmosphere, the train pipe, a main reservoir, an equalizing reservoir, and a brake application valve, and a movable member provided with ports and cavities coöperating with said seat ports and arranged in different positions to apply the brakes in service or emergency, to lap the brakes, to release the brakes, and to release the train brakes and hold the engine brakes, said valve seat being provided with another port communicating with a brake application valve, and said movable member being provided with one opening arranged in emergency position to connect the main reservoir to said brake application valve port and with an additional opening arranged in another position of the valve to also connect the main reservoir to said brake application valve port.

15. A Westinghouse standard engineer's valve having a seat provided with ports communicating with the atmosphere, the train pipe, a main reservoir, an equalizing reservoir and a brake application valve, and a movable member provided with ports and cavities coöperating with said seat ports and arranged in different positions to apply the brakes in service or emergency, to lap the brakes, to release the brakes, and to release the train brakes and hold the engine brakes, said valve seat being provided with additional ports, one communicating with a brake application valve and another communicating with a train pipe pressure supply valve, and said movable member being provided with one opening arranged in one position of the movable member to connect the main reservoir with said brake application valve and with another opening arranged in the same position and also in lap and running positions to connect the main reservoir to said train pipe pressure supply valve.

16. A Westinghouse standard engineer's valve having a seat provided with ports communicating with the atmosphere, the train pipe, a main reservoir, an equalizing reservoir and a brake application valve, and a movable member provided with ports and cavities coöperating with said seat ports and arranged in different positions to apply the brakes in service or emergency, to lap the brakes, to release the brakes, and to release the train brakes and hold the engine brakes, said movable member being provided with a cavity arranged in service position to connect the equalizing reservoir port to the atmosphere and with an opening arranged in another position of the valve to connect the main reservoir to the equalizing reservoir port to graduate off the brakes.

17. A Westinghouse standard engineer's valve having a seat provided with ports communicating with the atmosphere, the train pipe, a main reservoir, an equalizing reservoir and a brake application valve, and a movable member provided with ports and cavities coöperating with said seat ports and arranged in different positions to apply the brakes in service or emergency, to lap the brakes, to release the brakes, and to release the train brakes and hold the engine brakes, said rotary valve being provided with a cavity arranged in emergency application position to connect the main reservoir to said brake application valve port, and with an additional opening arranged in another position of said movable member to also connect the main reservoir to said brake application port, said valve in the last named position disconnecting communication between the main reservoir and equalizing reservoir.

In testimony whereof, I have hereunto set my hand.

JACOB RUSH SNYDER.

Witnesses:
Wm. P. Larkin,
William B. Wharton.